(12) United States Patent
Sridhar et al.

(10) Patent No.: US 9,133,972 B2
(45) Date of Patent: Sep. 15, 2015

(54) TUBE

(75) Inventors: Janardhana Sridhar, Mumbai (IN); Jyotsna Sareen, Mumbai (IN)

(73) Assignee: Conopco, Inc., Englewood Cliffs, NJ (US)

( * ) Notice: Subject to any disclaimer, the term of this patent is extended or adjusted under 35 U.S.C. 154(b) by 199 days.

(21) Appl. No.: 13/696,338

(22) PCT Filed: Apr. 8, 2011

(86) PCT No.: PCT/EP2011/055472
§ 371 (c)(1),
(2), (4) Date: Jan. 15, 2013

(87) PCT Pub. No.: WO2011/141242
PCT Pub. Date: Nov. 17, 2011

(65) Prior Publication Data
US 2013/0105021 A1 May 2, 2013

(30) Foreign Application Priority Data

May 13, 2010 (IN) .......................... 1517/MUM/2010
Jun. 25, 2010 (EP) ..................................... 10167332

(51) Int. Cl.
*F16L 55/10* (2006.01)
*B65D 1/09* (2006.01)
(Continued)

(52) U.S. Cl.
CPC .............. *F16L 55/1007* (2013.01); *B65D 1/095* (2013.01); *B65D 35/08* (2013.01); *B65D 35/44* (2013.01); *B65D 47/10* (2013.01); *Y02W 30/807* (2015.05)

(58) Field of Classification Search
CPC ........ B65D 1/095; B65D 35/08; B65D 47/10; B65D 35/44; F16L 55/1007
USPC .................... 138/89; 222/206, 209, 212, 215; 428/36.9, 36.92, 35.7
See application file for complete search history.

(56) References Cited

U.S. PATENT DOCUMENTS 3,204,835 A    9/1965   Michel
4,590,124 A *  5/1986   Schoenberg .................. 428/339
(Continued)

FOREIGN PATENT DOCUMENTS

GB         2120630         12/1983

OTHER PUBLICATIONS

PCT International Search Report and Written Opinion on International Application No. PCT/EP2011/055472 dated May 18, 2011.
(Continued)

*Primary Examiner* — Donnell Long
(74) *Attorney, Agent, or Firm* — Alan A. Bornstein

(57) ABSTRACT

The present invention relates to a container for holding viscous substance. More particularly the present invention relates to a squeezable tube (1) with an enclosable head (3). It is an object of the present invention to provide a tube which is easily recyclable and has relatively better stress crack resistance and squeezability. Surprisingly it has been found by the way of present invention that a mixture of Linear Low Density Polyethylene, Linear Medium Density Polyethylene and Ethylene Vinyl Acetate when used in certain weight percentage gives both the stress-crack resistance and the squeezability required for making a tube integral with head/cap. The tube of the present invention is recyclable together with the head/cap, thus making the process sustainable.

6 Claims, 3 Drawing Sheets

(51) Int. Cl.
   *B65D 35/08* (2006.01)
   *B65D 35/44* (2006.01)
   *B65D 47/10* (2006.01)

(56) References Cited

U.S. PATENT DOCUMENTS

| | | | |
|---|---|---|---|
| 5,314,749 A * | 5/1994 | Shah | 428/349 |
| 5,577,636 A | 11/1996 | Fukuoka et al. | |
| 6,384,093 B1 | 5/2002 | Bourland et al. | |
| 2003/0162856 A1 * | 8/2003 | Ramesh et al. | 521/142 |
| 2004/0171758 A1 * | 9/2004 | Ellul et al. | 525/192 |
| 2004/0171766 A1 * | 9/2004 | Agrawal | 525/452 |
| 2004/0173779 A1 * | 9/2004 | Gencer et al. | 252/387 |
| 2004/0177563 A1 * | 9/2004 | Prasad | 51/298 |
| 2004/0181015 A1 * | 9/2004 | Deckers et al. | 526/64 |
| 2004/0185200 A1 * | 9/2004 | Neculescu et al. | 428/35.7 |
| 2004/0185767 A1 * | 9/2004 | Schneider | 454/158 |
| 2004/0241482 A1 * | 12/2004 | Grah et al. | 428/518 |
| 2005/0113486 A1 * | 5/2005 | Sandieson et al. | 523/171 |
| 2006/0016837 A1 | 1/2006 | Cargile et al. | |
| 2006/0175279 A1 | 8/2006 | Miller et al. | |
| 2007/0014897 A1 * | 1/2007 | Ramesh | 426/106 |
| 2007/0066753 A1 | 3/2007 | Ehrlich et al. | |
| 2007/0138215 A1 | 6/2007 | Zahn et al. | |

OTHER PUBLICATIONS

EP Search Report on Application No. 10167332.5-1261 dated Nov. 18, 2010.

* cited by examiner

TUBE

TECHNICAL FIELD

The present invention relates to a tube. The present invention relates more particularly to a tube that is squeezable and reclosable.

BACKGROUND AND PRIOR ART

Tubes are generally made from flat laminates which are rolled up to form a tube. Alternately the tubes are also made by a coextrusion process with no joints on the walls of the tube; such tubes are called seamless tubes. The available tubes have typically two main components: a tube body and a head/cap. The tube body and the head/cap are generally manufactured separately and then assembled to get a complete tube. The materials of construction of the two parts are typically different as they serve different purpose.

One of the biggest problems in today's world is global warming. The more the number of stages for a particular process the more the carbon footprint and consequently it adds up to global warming. The problem associated with the current tubes is their recyclability. As the tube body and the head/cap are made of dissimilar materials, such tubes cannot be recycled completely unless the parts made with dissimilar materials are separated from each other before recycling. The tube body and the head/cap need to be recycled separately. This is a labour-intensive process, takes a long time and is difficult to practice on a large scale making recycling non-sustainable, inconvenient and also uneconomical.

A tube or container integral with a closable head is known in from US 2006/0016837 which describes a container having a removable tab which creates a dispensing opening when removed and where a lateral projection on said tab can be used to reseal the tube. This type of tube head assembly has been developed to minimize the risk of using a scissors or a knife for cutting the container cap to dispense the content. The container is said to be made by blow moulding or injection moulding.

GB 2 120 630 describes a container for unit dosing of liquid medication for ophthalmic surgery and for respiratory care. Such a container or vial is said to be made by injection molding of a suitable plastic material like polypropylene. However this document does not address the problem of providing a tube with a reclosable cap.

Other than the above prior art, multi-tube containers with twist-off breaking head are also known. U.S. Pat. No. 5,577,636 describes a multi-tube container having multiple tubes in parallel. The container includes a plurality of body portions, each of which have a hollow portion for containing contents, a plurality of twistable head portions formed at one end of each of the body portions, a plurality of neck portions, each of which can be broken off by twisting of the head portion, creating an opening for extruding the contents from the hollow portion and is located between the body portion and the head portion, and a plurality of sealing portions formed at the other end of each of said body portions. Each of the sealing portions are breakably connected to the adjacent sealing portions, and at least one of the head portions and the neck portions are breakably connected to each other. This document does not disclose a tube made of a single material.

However all the prior art is silent about a composition for making a tube unitarily with the head/cap such that the tube is squeezable and at the same time provides good stress crack resistance.

The prior art does not teach anything about the recyclability of the material and also does not disclose any specific material or composition that can contribute both stress-crack resistance and squeezability required for making the tube integral with the head or cap by using the same material so that the recyclability becomes easier and the process becomes sustainable and reduce the carbon footprint.

OBJECTS OF THE INVENTION

In view of the foregoing, it is therefore an object of the present invention to provide a tube which is easily recyclable.

It is another object of the present invention to provide a tube that is reclosable and has relatively better stress crack resistance and squeezability.

It is a further object of the present invention to provide a tube that can be integrally made by injection moulding.

Surprisingly it has been found by the way of the present invention that a mixture of Linear Low Density Polyethylene, Linear Medium Density Polyethylene and Ethylene Vinyl Acetate copolymer, when used in a certain weight percentage gives both the stress-crack resistance and the squeezability required for making a tube integral with a head/cap. The tube of the present invention is recyclable together with the head/cap, thus making the process sustainable.

SUMMARY OF THE INVENTION

According to a first aspect of the invention there is provided a tube comprising a tube body including a mouth connected to a break-off head via a frangible element with the head closing off the mouth; said head comprises a plug element and external contour of said plug element and internal contour of said mouth are adapted to be fittingly engageable, wherein the tube is integrally molded by an injection molding process using a composition comprising:
a) 60-80% w/w of Linear Low Density Polyethylene
b) 5-25% w/w of Linear Medium Density Polyethylene; and
c) 5-25% w/w of Ethylene Vinyl Acetate copolymer.

According to a second aspect of the present invention there is provided a process for making a tube of the first aspect comprising the steps of:
a) Injecting a melt of a composition comprising
  i. 60-80% w/w of Linear Low Density Polyethylene
  ii. 5-25% w/w of Linear Medium Density Polyethylene; and
  iii. 5-25% w/w of Ethylene Vinyl Acetate copolymer.
  into a mould for a tube of the first aspect
b) cooling the mould, and
c) demoulding the tube.

These and other aspects, features and advantages will become apparent to those of ordinary skill in the art from a reading of the following detailed description. For the avoidance of doubt, any feature of one aspect of the present invention may be utilised in any other aspect of the invention. It is noted that the figures given in the description below are intended to clarify the invention and are not intended to limit the invention to those figures per se. Similarly, all percentages are weight/weight percentages unless otherwise indicated.

Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

DETAILED DESCRIPTION OF THE INVENTION

Figure 1:
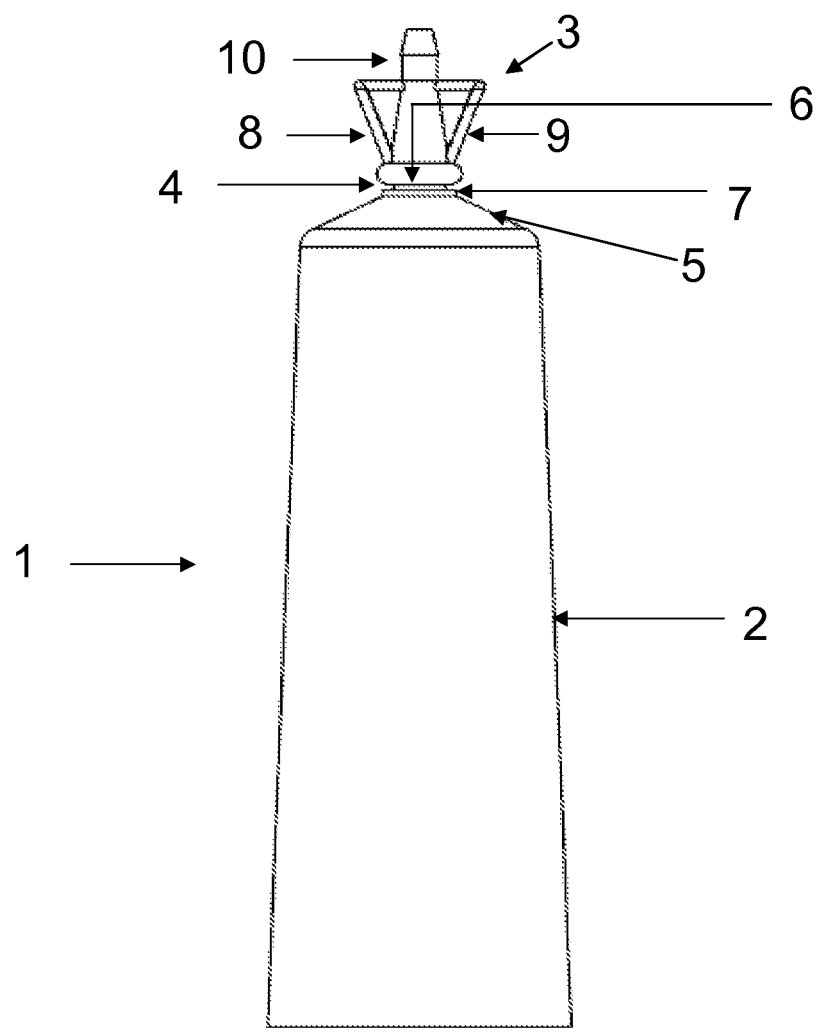
FIG. 1 is a perspective view of a preferred embodiment of the tube.

The present invention provides a tube comprising a tube body including a mouth connected to a break-off head via a frangible element with the head closing off the mouth; said head comprises a plug element; and external contour of said plug element and internal contour of said mouth are adapted to be fittingly engageable, wherein the tube is integrally molded by an injection molding process using a composition comprising:
a) 60-80% w/w of Linear Low Density Polyethylene
b) 5-25% w/w of Linear Medium Density Polyethylene; and
c) 5-25% w/w of Ethylene Vinyl Acetate copolymer.

Linear Low Density Polyethylene (LLDPE) is preferably selected from a butene comonomer based linear low density polyethylene grade with a narrow molecular weight distribution and optimum levels of antioxidants. The composition comprises 60-80%, preferably 65-75% w/w of linear low density polyethylene. The linear low density polyethylene has a melt flow index (MFI) of preferably 40-60 g/10 min more preferably 45-55 g/10 min. MFI is measured in accordance with ASTM standard D1238.

Linear Medium Density Polyethylene (LMDPE) is preferably selected from a butene comonomer based linear medium density polyethylene with normal dose of antioxidant. The composition comprises 5-25%, more preferably 10-20% w/w of linear medium density polyethylene. The linear medium density polyethylene has a melt flow index of preferably 3-5.5 g/10 min more preferably 4-5 g/10 min.

The composition of the invention also comprises Ethylene Vinyl Acetate copolymer (EVA). The composition comprises 5-25%, preferably 10-20% w/w of ethylene vinyl acetate copolymer. The ethylene vinyl acetate copolymer has a melt flow index of preferably 10-40 g/10 min more preferably 20-30 g/10 min.

The polymer composition may be used to produce tubes that may be clear/transparent, opaque white or coloured as required. The tube body of the invention is preferably cylindrical. The tube body preferably has a shoulder section adjacent and tapered towards the mouth. The break-off head, which is connected to the mouth via a frangible element is preferably separated from the tube by applying mechanical force or by twisting. The mouth remains closed until the break-off head is separated from the tube. This feature make the tube tamper evident. The break-off head can be of different shapes and size without affecting its function. The mouth serves as a dispensing hole for the material inside the tube when the break-off head is separated.

The break-off head comprises a plug element. The plug element is preferably elongate and more preferably cylindrical. The plug element preferably has a frusto-conical shaped end; tapering away from the head. The external contour of the plug element and the internal contours of the said mouth are adapted to be fittingly engageable. The plug element is capable of reclosing the mouth once the break-off head is separated and the mouth is exposed, by insertion. It will be appreciated that the plug element again can be removed and reinserted allowing repeated reclosability during use.

The tube preferably comprises a ring element circumscribing the mouth. The ring element secures the plug element firmly while closing the mouth of the tube with the plug element. The ring element can be of different shapes and sizes depending on the plug element and the mouth such that the external contour of plug element and internal contour of mouth are fittingly engageable.

The frangible element through which the tube body and the break-off head is connected, is frangible enough to be broken by applying mechanical force or by twisting the head. Once the head is separated, the mouth is exposed for discharging the content of the tube. To provide this feature of easy breakability, the frangible element preferably has the lowest cross-section along the axis of the tube.

Figure 2:
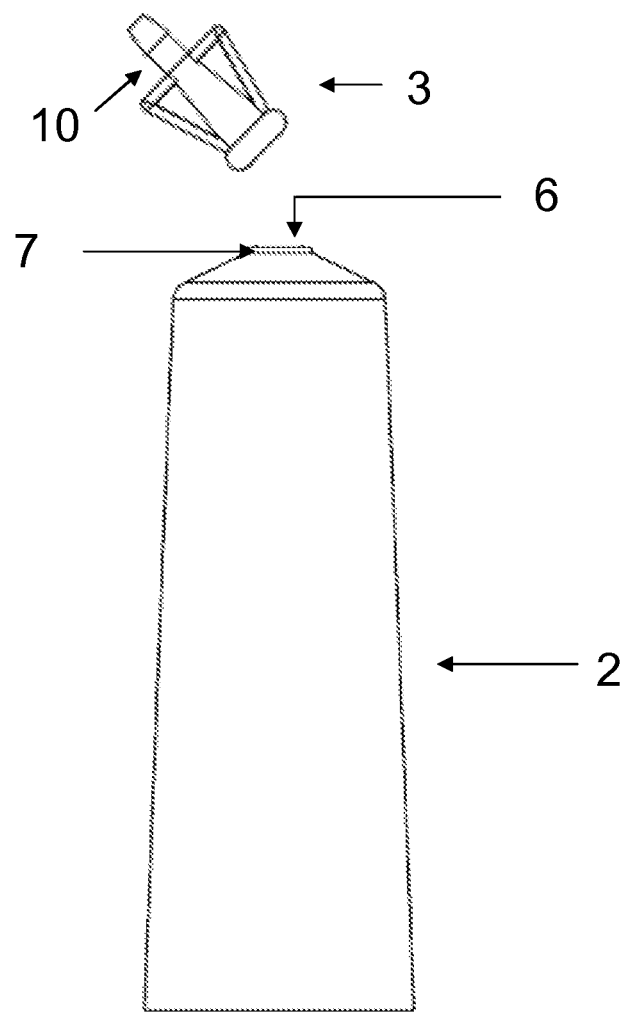
FIG. 2 is the perspective view of the tube of FIG. 1 after separating the break-off head.
Figure 3:
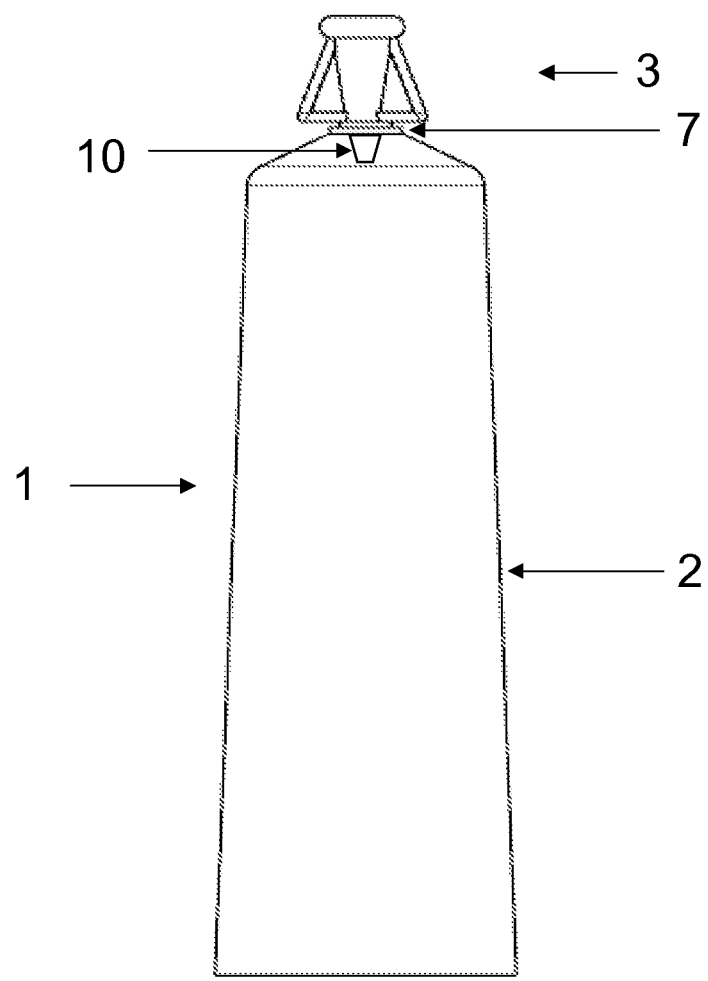
FIG. 3 is perspective view of the tube of FIG. 2 after reclosing the tube.

The invention will now be illustrated with the help of a specific non-limiting example of a tube according to the invention in FIGS. 1-3. The figures in no way limit the scope of the invention.

DETAILED DESCRIPTION OF THE DRAWINGS

Referring to FIG. 1, the tube (1) comprises a tube body (2) and a break-off head (3) which are connected via a frangible element (4). The tube body preferably has a shoulder section (5) adjacent and tapered towards the mouth (6). The tube body includes a ring element (7) in the tube body circumscribing the mouth. The break-off head comprises two wings (8) and (9). The wings (8) and (9) assist to apply force for breaking the head off by twisting. The break-off head comprises a plug element (10). The external contour of the plug element and the internal contours of the mouth are fittingly engageable. The plug element has a frusto-conical shaped end; tapering away from the head. The break-off head is separated from the tube body by applying mechanical force or twisting it.

Now referring to FIG. 2, which is the representation of the tube of FIG. 1 after separating the break-off head (3). After separation the mouth is exposed for dispensing the tube contents by squeezing the tube body (2). After dispensing the contents of the tube the plug element can be inserted into the mouth to reclose the tube.

Now referring to FIG. 3, which is a perspective view of the tube of FIG. 2 after reclosing the mouth. The ring element gives support to the plug element while inserting it in the mouth and keeps the plug firmly secured.

It will be appreciated that, in use, separating the break-off head exposes the mouth through which the tube contents can be dispensed conveniently by squeezing the tube body. After dispensing, the tube can be reclosed by inserting the plug element in the mouth. The ring element allows the closing mechanism to functions properly without leaking.

Now the invention will be demonstrated with the help of examples. The following examples are for illustrations only and in no way limits the scope of the invention.

EXAMPLES

Process for Making the Tube of the Invention

The process of making the tube of FIG. 1 by an injection moulding process is as described below:
(a) The pellets/powder of the polymers [LLDPE (70%)+LMDPE (15%)+EVA (15%)] are fed from a hopper into an injection moulding machine.
(b) The injection moulding machine consists of a hollow steel barrel, including a rotating screw. The screw carries the plastic along the barrel to the mould. Heaters surrounding the barrel melt the plastic as it travels along the barrel.
(c) The screw is forced back as the melted plastic collects at the end of the barrel. Once enough plastic is collected, a hydraulic ram pushes the screw forward injecting the plastic through a sprue into a mould cavity. The mould is warmed before injecting and the plastic is injected quickly to prevent it from hardening before the mould is full
(d) Pressure is maintained for a short time to prevent the material creeping back during setting (hardening). This prevents shrinkage and hollows, therefore giving a better quality product. The moulding is left to cool before removing (ejection) from the mould.
(e) The tube of the FIG. 1 is ejected from the mould (demoulding) either with the help of ejector pins or a stripper plate. The molding takes on the shape of the mould cavity.

Effect of Polymer Composition on Tube Properties

The squeezability of tubes was measured by filling the tube with Fair & Lovely® (Hindustan Unilever Ltd) skin cream and heat sealing the bottom portion. The break-off head was separated from the tube body to expose the mouth. The tube was squeezed manually between thumb and forefinger to dispense the material from the tube mouth. The squeezability was qualitatively rated as "easy to squeeze" (Y) or "difficult and hard to squeeze" (N).

For measuring test crack resistance the following procedure was followed. Two beakers were taken and filled one of the beakers with 60% w/w of Fair & Lovely R solution in water (which is to be put inside the tube) and another with 50% w/w aqueous detergent (Teepol® from Harvey Waddington (UK)) solution. After that two different tubes were put in those respective beakers. The beakers were kept at 50° C. in a heating oven and observed for cracks after every 24 hours and maintained for 48 hours to rate the stress crack resistance qualitatively.

The tube of FIG. 1 was made with various polymer compositions as tabulated below in table 1.

TABLE 1

Effect of polymer composition on tube properties
(LDPE is 16 MA 400, HDPE is 50 MA 180,
LLDPE is M 26500 and LMDPE is LL 36RA045,
all available from Reliance Polymers India and EVA is Ateva®
2825A available from Celanese EVA Performance Polymers)

| Example No. | Polymer combination | Ease of squeezability | Stress crack resistance |
|---|---|---|---|
| A | LDPE (80%) + HDPE (10%) + EVA (10%) | Y | Not good |
| B | LLDPE (80%) + HDPE (20%) | N | Not good |
| C | LDPE (90%) + EVA (10%) | Y | Not good |
| D | LLDPE (10%) + LDPE (80%) + EVA (10%) | Y | Not good |
| E | LLDPE (20%) + LDPE (70%) + EVA (10%) | Y | Not good |
| 1 | LLDPE (70%) + LMDPE (15%) + EVA (15%) | Y | Good |

LDPE—Low Density Polyethylene,
HDPE—High Density Polyethylene

The LLDPE, LMDPE and EVA used in table 1 had a MFI of 50 g/10 min, 4.5 g/10 min and 25 g/10 min respectively.

In table 1, example 1 was the tube made using the composition of the invention and comparative examples A, B, C, D and E are tubes made from the composition outside the scope of the present invention. From the above table it is evident that the tube made according to the present invention has relatively better stress crack resistance and squeezability.

Measurement of Breakage Force for the Break-Off Head of the Tube of FIG. 1

The measurement of the breakage force for the break-off head is done using a Universal Testing Machine (UTM). The test speed for the test was 33 mm/min. The tube of example 1 was inserted into a fixture and fitted between the grippers/holders of the moving platen of the UTM. The test was then started and the moving platen started moving up while the load (10 kg) was being stationary on the top. The position of the tube is adjusted in such a manner so that the load will be applied at the frangible element provided in the tube. Then the breakage force for separating the break-off head was recorded.

Breakage force for the break-off head was found to be in the range of 12-15N (16 samples). This breakage force indicates that the tube head can be easily separated from the tube body.

It will thus be appreciated that the present invention provides a tube which is easily recyclable. The present invention also provides a tube that is reclosable and has relatively better stress crack resistance and squeezability and made integrally with head by injection moulding.

The invention claimed is:

1. A tube (1) comprising a tube body (2) including a mouth (6) connected to a break-off head (3) via a frangible element (4) with the head closing off the mouth; said head comprises a plug element (10) and external contour of said plug element and internal contour of said mouth are adapted to be fittingly engageable, wherein the tube is integrally molded by injection molding process using a composition comprising:
 a) 60-80% w/w of Linear Low Density Polyethylene, wherein the Linear Low Density Polyethylene has a melt flow index of 40-60 g/10 min;
 b) 5-25% w/w of Linear Medium Density Polyethylene, wherein the Linear Medium Density Polyethylene has a melt flow index of 3-5.5 g/10 min; and
 c) 5-25% w/w of Ethylene Vinyl Acetate copolymer, wherein the Ethylene Vinyl Acetate copolymer has a melt flow index of 10-40 g/10 min.

2. A tube as claimed in claim 1 wherein the tube body has a shoulder section (5) adjacent and tapered towards the mouth.

3. A tube as claimed in claim 1 comprises a ring element (7) circumscribing the mouth.

4. A tube as claimed in claim 1 wherein the plug element in the break-off head is used as a closable means for the mouth.

5. A tube as claimed in claim 1 wherein the frangible element has the lowest cross-section along the axis of the tube.

6. A process for making a tube as claimed in claim 1, the process comprising the steps of:
 a) Injecting a melt of a composition comprising
  i. 60-80% w/w of Linear Low Density Polyethylene, wherein the Linear Low Density Polyethylene has a melt flow index of 40-60 g/10 min;
  ii. 5-25% w/w of Linear Medium Density Polyethylene, wherein the Linear Medium Density Polyethylene has a melt flow index of 3-5.5 g/10 min; and
  iii. 5-25% w/w of Ethylene Vinyl Acetate copolymer wherein the Ethylene Vinyl Acetate copolymer has a melt flow index of 3-5.5 g/10 min,
  into a mould,
 b) cooling the mould, and
 c) demoulding the tube.

* * * * *